US012266893B2

(12) United States Patent
Mutnury et al.

(10) Patent No.: US 12,266,893 B2
(45) Date of Patent: Apr. 1, 2025

(54) CONNECTION ASSEMBLY FOR USE IN AN INFORMATION HANDLING SYSTEM

(71) Applicant: Dell Products L.P., Round Rock, TX (US)

(72) Inventors: Bhyrav M. Mutnury, Austin, TX (US); Mark A. Smith, Georgetown, TX (US); Sandor Farkas, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 424 days.

(21) Appl. No.: 17/659,667

(22) Filed: Apr. 19, 2022

(65) Prior Publication Data

US 2023/0335953 A1 Oct. 19, 2023

(51) Int. Cl.

| | |
|---|---|
| ***H01R 12/70*** | (2011.01) |
| ***H01R 12/72*** | (2011.01) |
| ***H01R 13/646*** | (2011.01) |
| ***H01R 13/6582*** | (2011.01) |

(52) U.S. Cl.

CPC ......... *H01R 13/6582* (2013.01); *H01R 12/72* (2013.01); *H01R 13/646* (2013.01)

(58) Field of Classification Search

CPC ............ H01R 13/6582; H01R 13/6581; H01R 13/648; H01R 13/646; H01R 12/72; H01R 12/716; H01R 12/71; H01R 12/70

USPC .......................................................... 439/131

See application file for complete search history.

(56) References Cited

U.S. PATENT DOCUMENTS

| | | | | | |
|---|---|---|---|---|---|
| 7,210,952 | B2 * | 5/2007 | Ishida | H05K 7/1061 | 439/331 |
| 8,075,330 | B1 * | 12/2011 | Deng | H01R 13/6275 | 439/328 |
| 8,083,526 | B2 * | 12/2011 | Long | H01R 12/721 | 439/60 |
| 8,303,324 | B2 * | 11/2012 | Franke | H01R 12/83 | 439/326 |
| 8,979,568 | B2 * | 3/2015 | Herbrechtsmeier | H01R 13/62966 | 439/346 |
| 9,203,175 | B1 * | 12/2015 | Osa | H01R 24/60 | |
| 9,252,532 | B2 * | 2/2016 | Riedel | H01R 25/14 | |
| 9,270,063 | B2 * | 2/2016 | Tang | H01R 13/7175 | |
| 9,312,625 | B2 * | 4/2016 | Shen | H01R 13/4534 | |
| 9,548,574 | B2 * | 1/2017 | Hsu | H01R 13/7038 | |

(Continued)

*Primary Examiner* — Harshad C Patel

(74) *Attorney, Agent, or Firm* — McDermott Will & Emery LLP

(57) ABSTRACT

A connection assembly including a receptacle connector having a first and a second end, including: a shell, including a first outer surface and a second outer surface; a shield surrounding the shell, the shield including: a first portion including a first cam flange, the first portion rotatable about a first spring hinge; a second portion including a second cam flange, the second portion rotatable about a second spring hinge; a mating connector removable coupleable to the receptacle connector, including: an adjustment member, wherein, when a positioning of the adjustment member is adjusted to decrease a distance between the adjustment member and the second end of the receptacle connector, the adjustment member adjusts a distance between the first cam flange and the second cam flange to rotate the first portion of the shield about the first spring hinge and rotate the second portion of the shield about the second spring hinge.

20 Claims, 17 Drawing Sheets

(56) References Cited

U.S. PATENT DOCUMENTS

| | | | | |
|---|---|---|---|---|
| 9,564,710 | B2 * | 2/2017 | Ebihara ............ | H01R 13/62938 |
| 9,595,790 | B1 * | 3/2017 | Cao .................. | H01R 13/62911 |

* cited by examiner

CONNECTION ASSEMBLY FOR USE IN AN INFORMATION HANDLING SYSTEM

BACKGROUND

Field of the Disclosure

The disclosure relates generally to a connection assembly for use in an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As signal speeds continue to increase, small impairments to the signal can adversely impact signal integrity (SI).

SUMMARY

Innovative aspects of the subject matter described in this specification may be embodied in a connection assembly for use in an information handling system, the connection assembly including: a receptacle connector having a first end and a second end opposite to the first end, the receptacle connector including: a shell, including a first outer surface and a second outer surface opposite to the first outer surface; a plurality of contacts; a shield surrounding the shell, the shield including: a first portion including a first cam flange, the first portion rotatable about a first spring hinge; a second portion including a second cam flange, the second portion rotatable about a second spring hinge; a mating connector removable coupleable to the receptacle connector, the mating connector including: a computing card; and an adjustment member, wherein, when the mating connector is coupled to the receptacle connector, the mating connector is in contact with the first cam flange and the second cam flange, and wherein, when a positioning of the adjustment member is adjusted to decrease a distance between the adjustment member and the second end of the receptacle connector, the adjustment member adjusts a distance between the first cam flange and the second cam flange to rotate the first portion of the shield about the first spring hinge and rotate the second portion of the shield about the second spring hinge.

Other embodiments of these aspects include corresponding systems and apparatus.

Particular implementations of the subject matter described in this specification can be implemented so as to realize one or more of the following advantages. For example, when the positioning of the adjustment member is adjusted to decrease the distance between the adjustment member and the second end of the receptacle connector, the adjustment member adjusts the distance between the first cam flange and the second cam flange to i) rotate the first portion of the shield about the first spring hinge to increase a distance between the first outer surface and the first portion of the shield and ii) rotate the second portion of the shield about the second spring hinge to increase a distance between the second outer surface and the second portion of the shield. The adjustment member is a threaded-conical member. The adjustment member is a multi-sided pyramid threaded-conical member. The adjustment member is an eccentric cam with a plurality of predefined geometries. The mating connector further includes mating tabs and the receptacle connector includes mating apertures, wherein, when the mating connector is coupled to the receptacle connector, the mating tabs of the mating connector are positioned within the mating apertures of the receptacle connector. When the mating connector is coupled to the receptacle connector, the computing card of the mating connector is in contact with the plurality of contacts of the receptacle connector. The receptacle connector includes a first post and a second post, the first portion of the shield includes a first aperture, and the second portion of the shield includes a second aperture, wherein the first post of the receptacle connector is positioned within the first aperture to define the rotation of the first portion of the shield about the first spring hinge and the second post of the receptacle connector is positioned within the second aperture to define the rotation of the second portion of the shield about the second spring hinge. The increased distances increases a dielectric height of the connection assembly. The increased distances adjusts a resonance frequency of the connection assembly.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
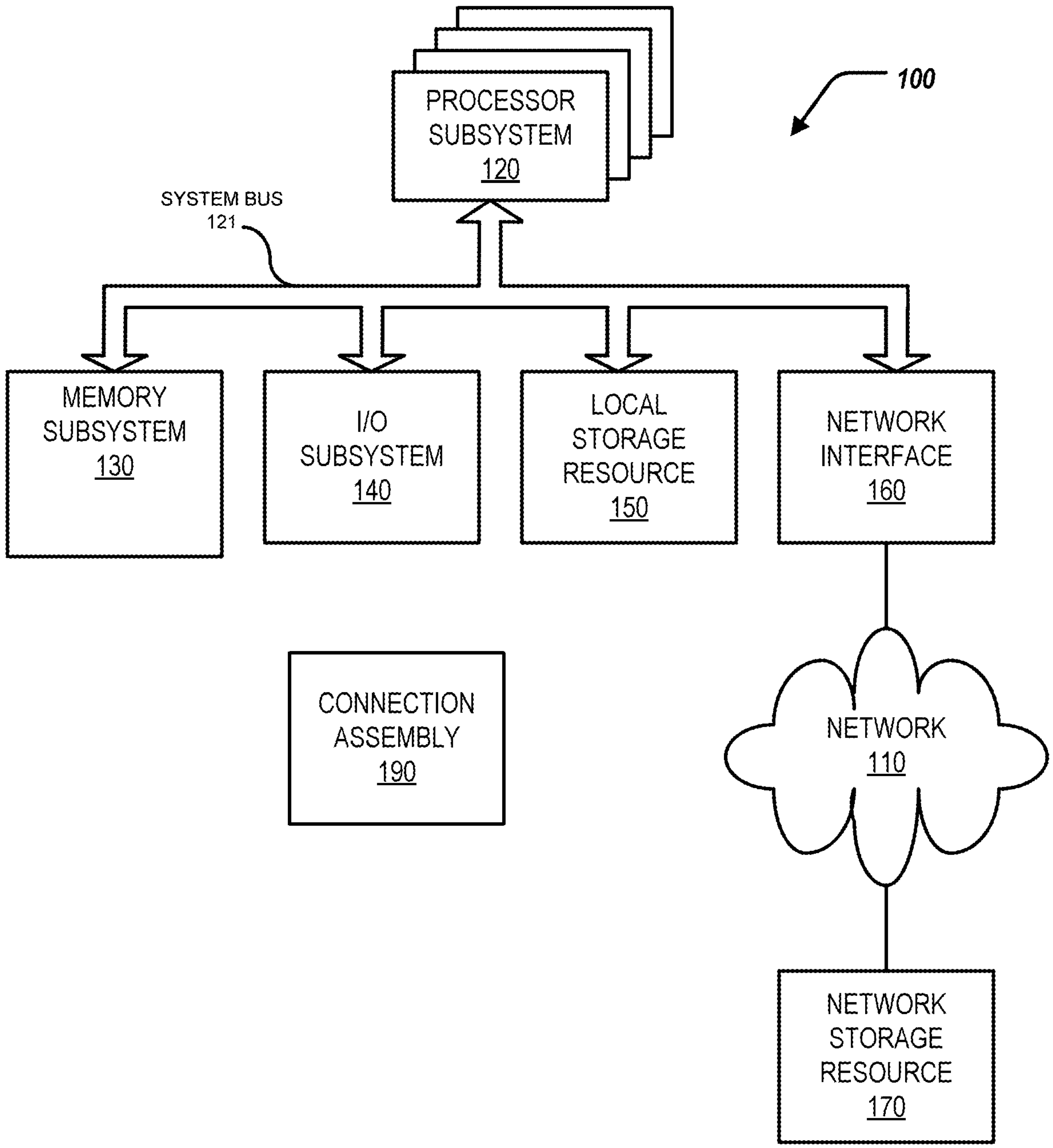
FIG. 1 is a block diagram of selected elements of an embodiment of an information handling system.

This disclosure discusses a connection assembly for use in an information handling system. In short, a resonance of a connection assembly can be adjusted depending on a frequency of operation. The connector resonance frequency can be "locked" to a desired frequency (that is spaced from a frequency of operation of the connection assembly). A distance between a shield and an underlaying shell of a receptacle connector can be adjusted to increase an air gap therebetween, resulting in an increase in dielectric height, and an adjustment to the resonance frequency of the connection assembly.

Specifically, this disclosure discusses a connection assembly for use in an information handling system, the connection assembly including: a receptacle connector having a first end and a second end opposite to the first end, the receptacle connector including: a shell, including a first outer surface and a second outer surface opposite to the first outer surface; a plurality of contacts; a shield surrounding the shell, the shield including: a first portion including a first cam flange, the first portion rotatable about a first spring hinge; a second portion including a second cam flange, the second portion rotatable about a second spring hinge; a mating connector removable coupleable to the receptacle connector, the mating connector including: a computing card; and an adjustment member, wherein, when the mating connector is coupled to the receptacle connector, the mating connector is in contact with the first cam flange and the second cam flange, and wherein, when a positioning of the adjustment member is adjusted to decrease a distance between the adjustment member and the second end of the receptacle connector, the adjustment member adjusts a distance between the first cam flange and the second cam flange to rotate the first portion of the shield about the first spring hinge and rotate the second portion of the shield about the second spring hinge.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-10 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can further include a connection assembly 190.

In short, a resonance of the connection assembly 190 can be adjusted depending on a frequency of operation. The connection resonance frequency can be "locked" to a desired frequency (that is spaced from a frequency of operation of the connection assembly 190). A distance between a shield and an underlaying shell of a receptacle connector can be adjusted to increase an air gap therebetween, resulting an increase in dielectric height, and an adjustment resonance frequency of the connection assembly 190.

Figure 2:
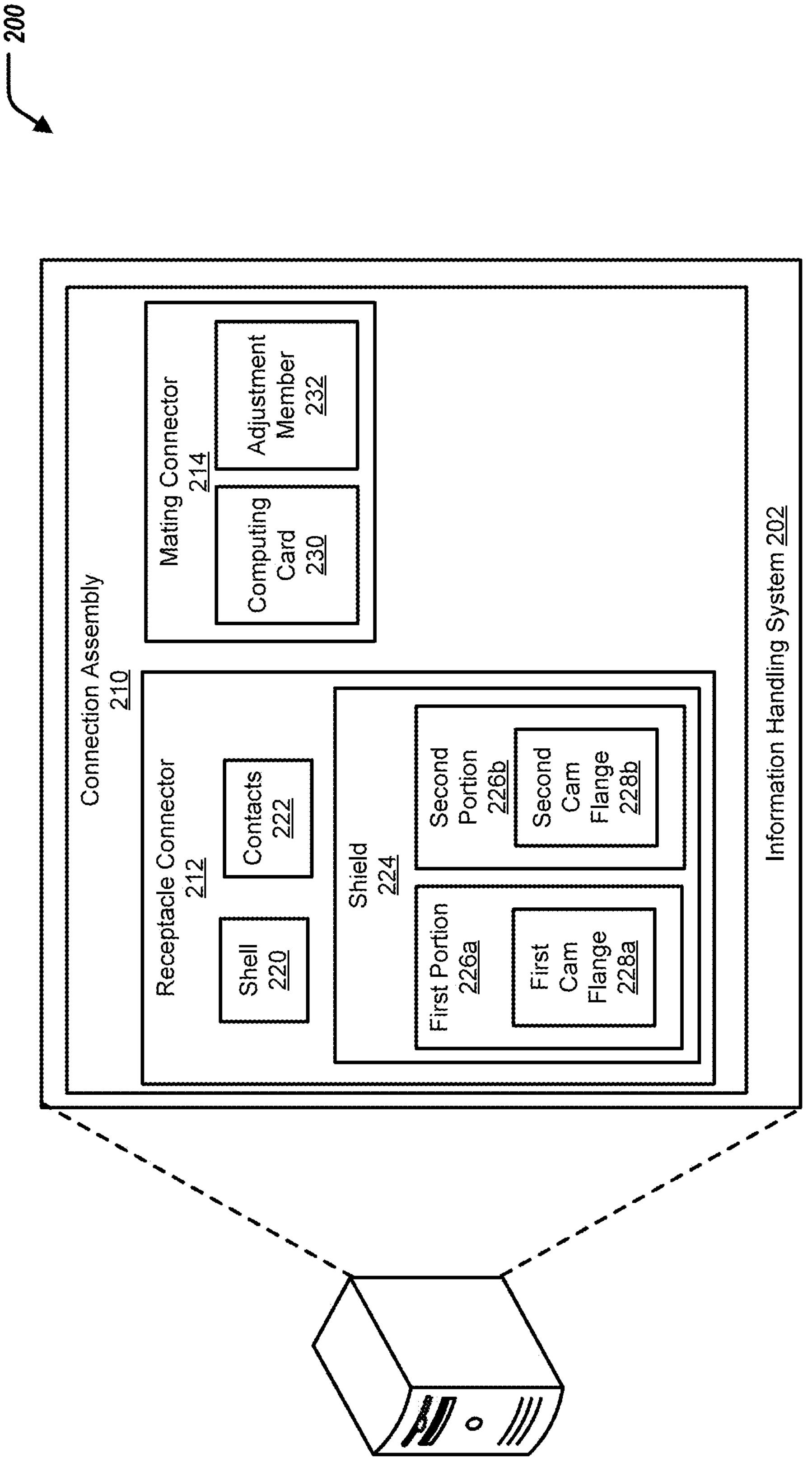
FIG. 2 illustrates a block diagram of an information handling system including a connection assembly.

Turning to FIG. 2, FIG. 2 illustrates an environment 200 including an information handling system 202. The information handling system 202 can include a connection assembly 210. In some examples, the information handling system 202 is similar to, or includes, the information handling system 100 of FIG. 1. In some examples, the connection assembly 210 is similar to, or includes, the information connection assembly 190 of FIG. 1.

The connection assembly 210 can include a receptacle connector 212 and a mating connector 214. The receptacle connector 212 can include a shell 220, contacts 222, and a shield 224. The shield 224 can include a first portion **226*a* and a second portion 226*b* (collectively referred to as portions 226). The first portion 226*a* can include a first cam flange 228*a* and the second portion 226*b* can include a second cam flange 228*b* (collectively referred to as cam flanges 228). The mating connector 214 can include a computing card 230 and an adjustment member 232**.

Figure 3A:
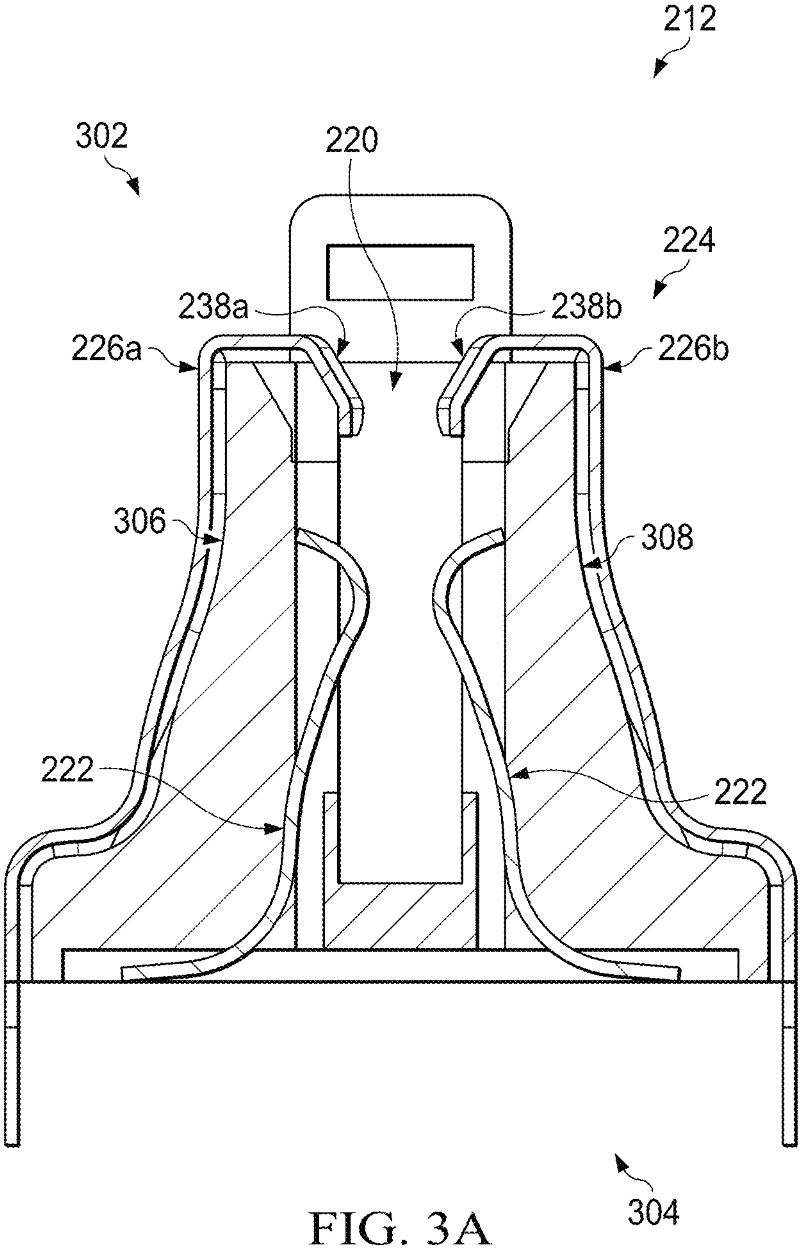
FIGS. 3A, 3B illustrate a receptacle connector of the connection assembly.
Figure 3B:
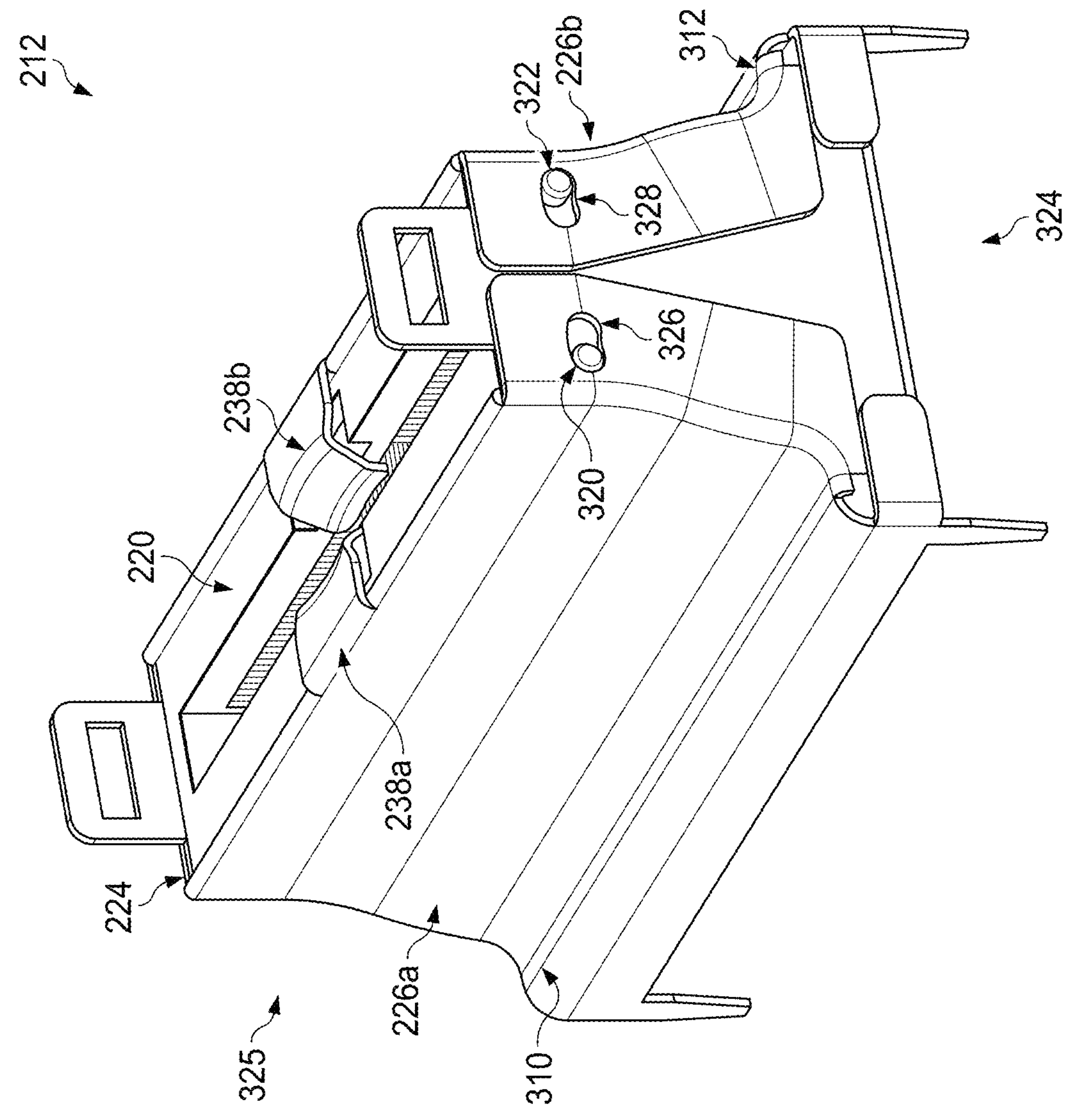

FIGS. 3A, 3B illustrate a physical representation of the receptacle connector 212. The receptacle connector 212 can include a first end 302 and a second end 304. The first end 302 can be opposite to the second end 304. The receptacle connector 212 can include the shell 220. The shell 220 can include a first outer surface 306 and a second outer surface 308. The second outer surface 308 is opposite to the first outer surface 306. The receptacle connector 212 can further include a plurality of contacts 222.

The receptacle connector 212 can further include the shield 224 that surrounds the shell 220. The shield 224 can include the first portion **226*a* and the second portion 226*b*. The first portion 226*a* of the shield 224 can include the first cam flange 238*a*. The first portion 226*a* of the shield 224 is rotatable about a first spring hinge 310. The second portion 226*b* of the shield 224** can include the second cam flange

238*b*. The second portion 226*b* of the shield 224 is rotatable about a second spring hinge 312.

The receptacle connector 212 can further include a first post 320 and a second post 322 on a front side 324 of the receptacle connector 212. The first portion 226*a* of the shield 224 can further a first aperture 326. The second portion 226*b* of the shield 224 can further a second aperture 328. The first post 320 can be positioned within the first aperture 326 to define the rotation of the first portion 226*a* of the shield 224 about the first spring hinge 310. The second post 322 can be positioned within the second aperture 328 to define the rotation of the second portion 226*b* of the shield 224 about the second spring hinge 312.

Furthermore, the receptacle connector 212 can further include posts on a back side 325 of the receptacle connector, similar to the posts 320, 322, that are positioned within respective apertures (similar to apertures 326, 328) to define rotation of the portions 226*a*, 226*b* of the shield 224.

Figure 4A:
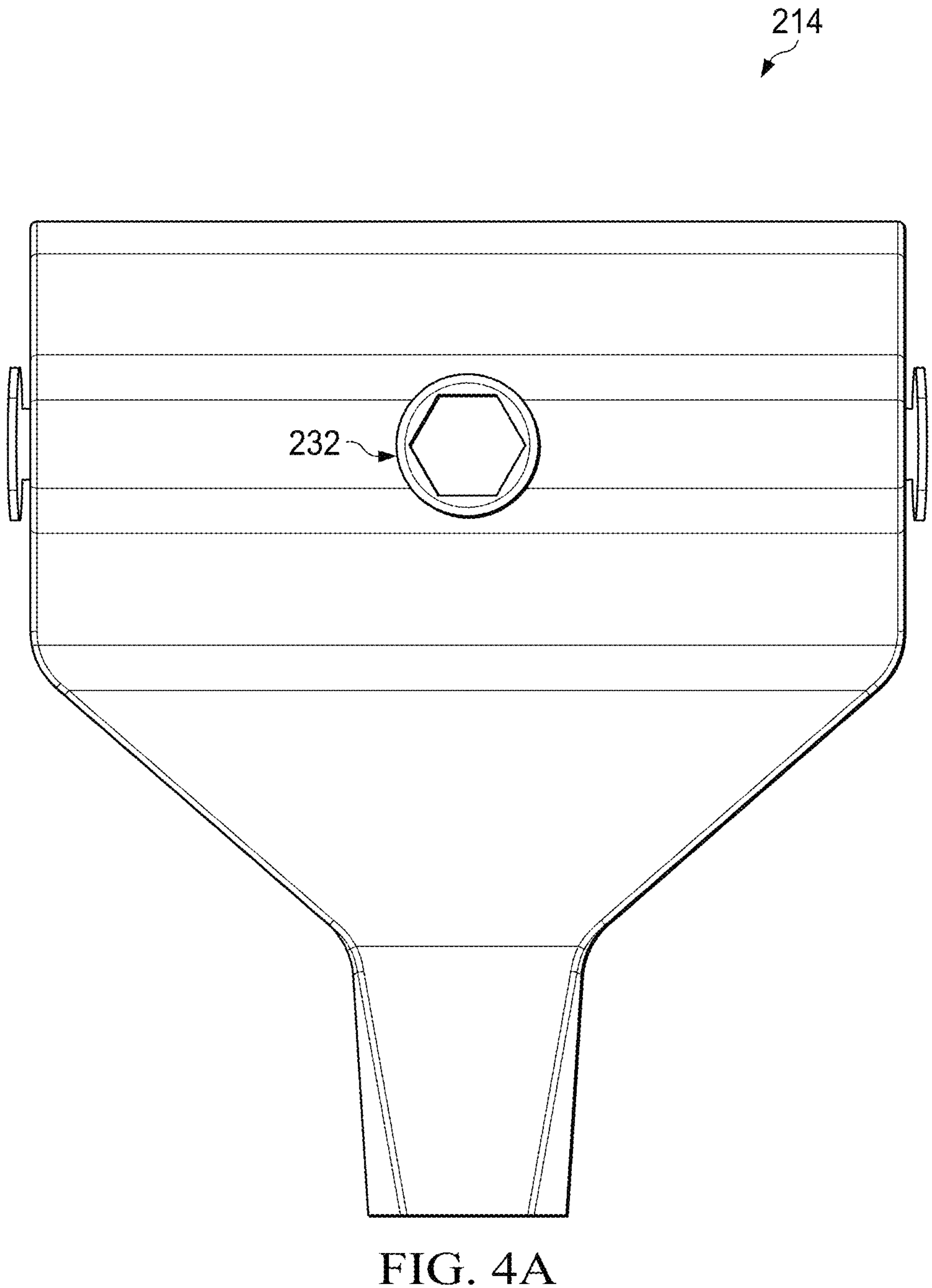
FIGS. 4A, 4B illustrate a mating connector of the connection assembly.
Figure 4B:
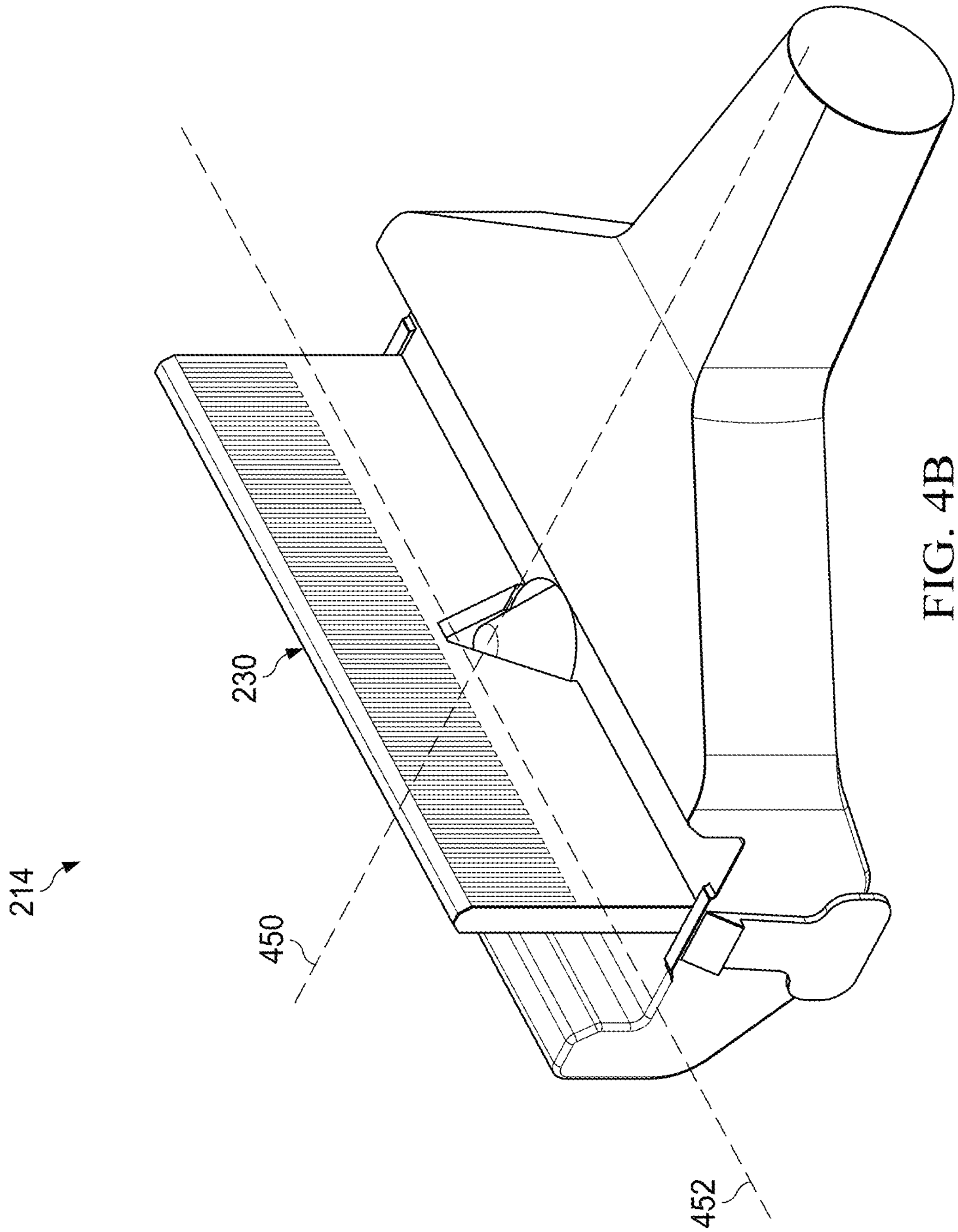
Figure 5A:
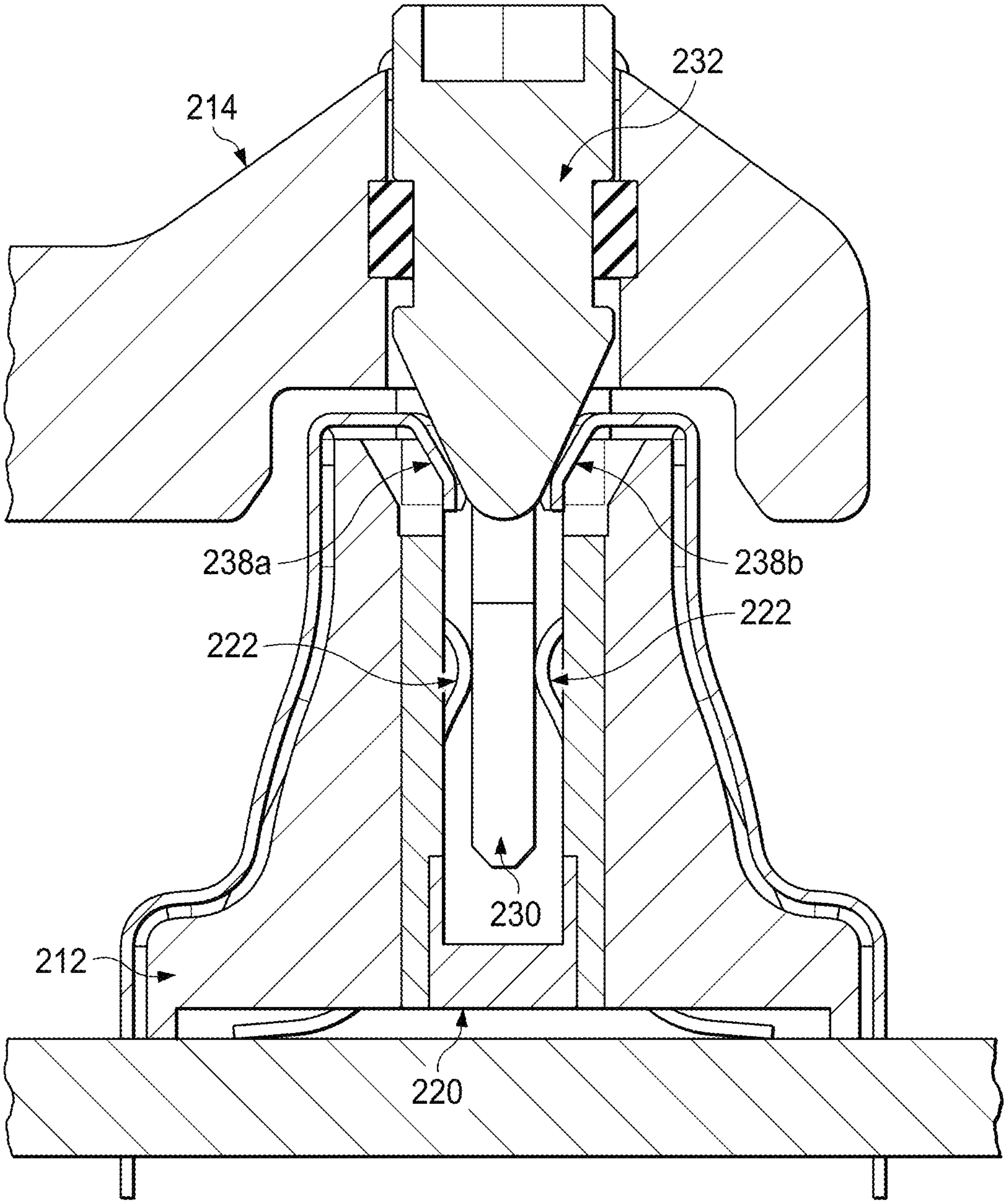
FIGS. 5A, 5B illustrate the mating connector coupled with the connection assembly.
Figure 5B:
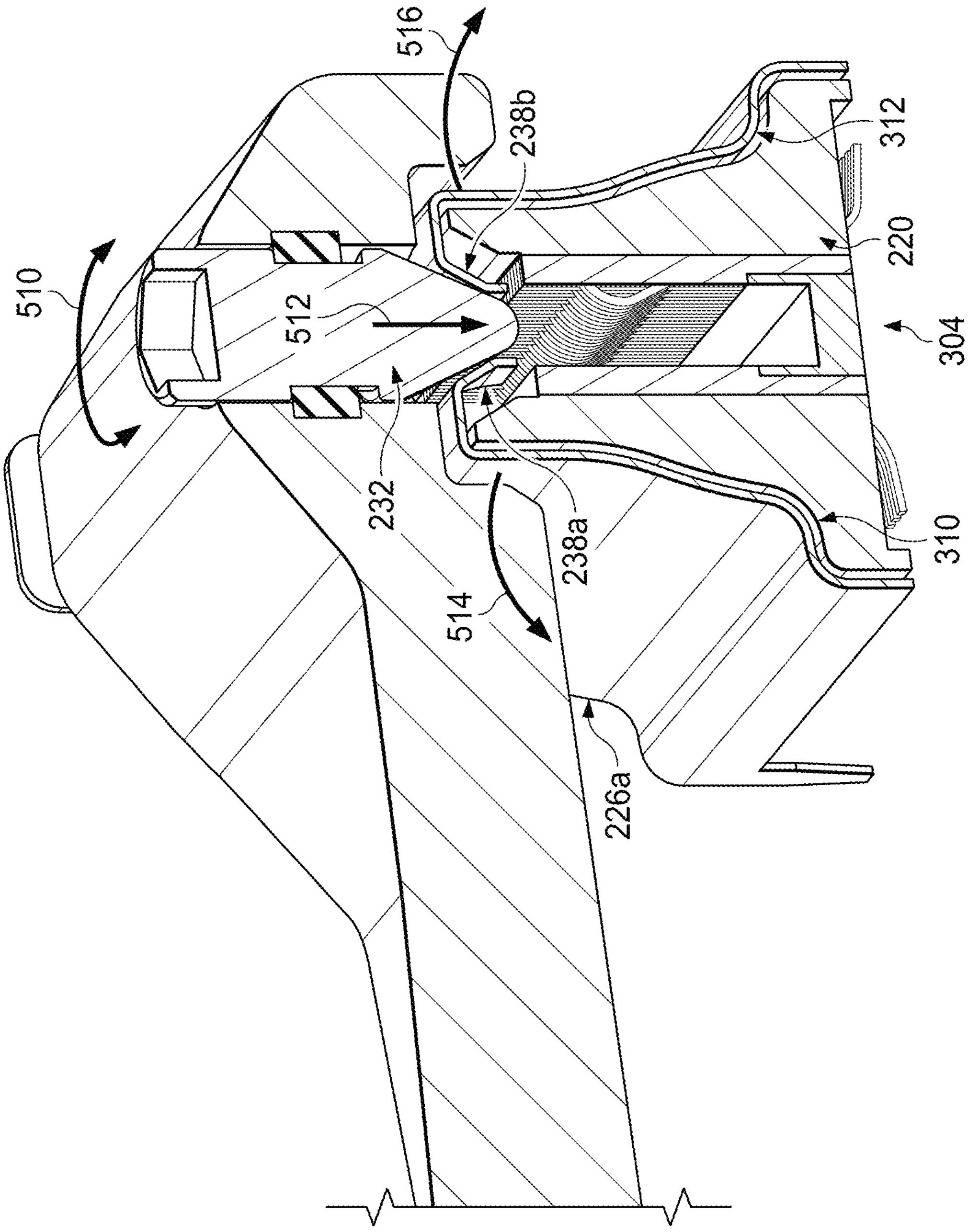

FIGS. 4A, 4B illustrate a physical representation of the mating connector 214. The mating connector 214 can be removable coupleable to the receptacle connector 212, described further herein. The mating connector 214 can include the computing card 230 and the adjustment member 232. In some examples, the adjustment member 232 is a threaded-conical member, as shown in FIGS. 5A, 5B. In some examples, the adjustment member 232 is positioned in a middle of the mating connector 214, as shown in FIG. 4B. That is, the adjustment member 232 can be positioned along the intersection of axis 450, 452. As such, a portion of the computing card 230 adjacent to the adjustment member 232 can be removed to accommodate the adjustment member 232.

The mating connector 214 can be coupled to the receptacle connector 212, as shown in FIG. 5A. When the mating connector 214 is coupled to the receptacle connector 212, the mating connector 214 is contact with the first cam flange 238*a* and the second cam flange 238*b*. Furthermore, when the mating connector 214 is coupled to the receptacle connector 212, the computing card 230 is in contact with the contacts 222 of the receptacle connector 212.

Referring to FIGS. 5A, 5B, to that end, the positioning of the first portion 226*a* of the shield 224 and the second portion 226*b* of the shield 224 can be adjusted relative to the shell 220. Specifically, the positioning of the adjustment member 232 can be adjusted to decrease a distance between the adjustment member 232 and the second end 304 of the receptacle connector 212. In some examples, the adjustment member 232 can be rotated, as shown by 510, to translate the adjustment member 232 along the direction 512, e.g., towards the second end 304 of the receptacle connector 212. However, the adjustment member 232 can be translated along the direction 512 by any means and not limited to rotation. To that end, by decreasing the distance between the adjustment member 232 and the second end 304 of the receptacle connector 212 (shown by 512), the adjustment member 232 adjusts a distance between the first cam flange 238*a* and the second cam flange 238*b*. That is, the adjustment member 232 increases a distance between the first cam flange 238*a* and the second cam flange 238*b*. By increasing the distance between the first cam flange 238*a* and the second cam flange 238*b*, the first portion 226*a* of the shield 224 is rotated about the first spring hinge 310 (shown by 514); and the second portion 226*b* of the shield 224 is rotated about the second spring hinge 312 (shown by 516). In summary, when the positioning of the adjustment member 232 is adjusted to decrease the distance between the adjustment member 232 and the second end 304 of the receptacle connector 212, the adjustment member 232 adjusts the distance between the first cam flange 238*a* and the second cam flange 238*b* to rotate the first portion 226*a* of the shield 224 about the first spring hinge 310 and rotate the second portion 226*b* of the shield 224 about the second spring hinge 312.

Figure 6:
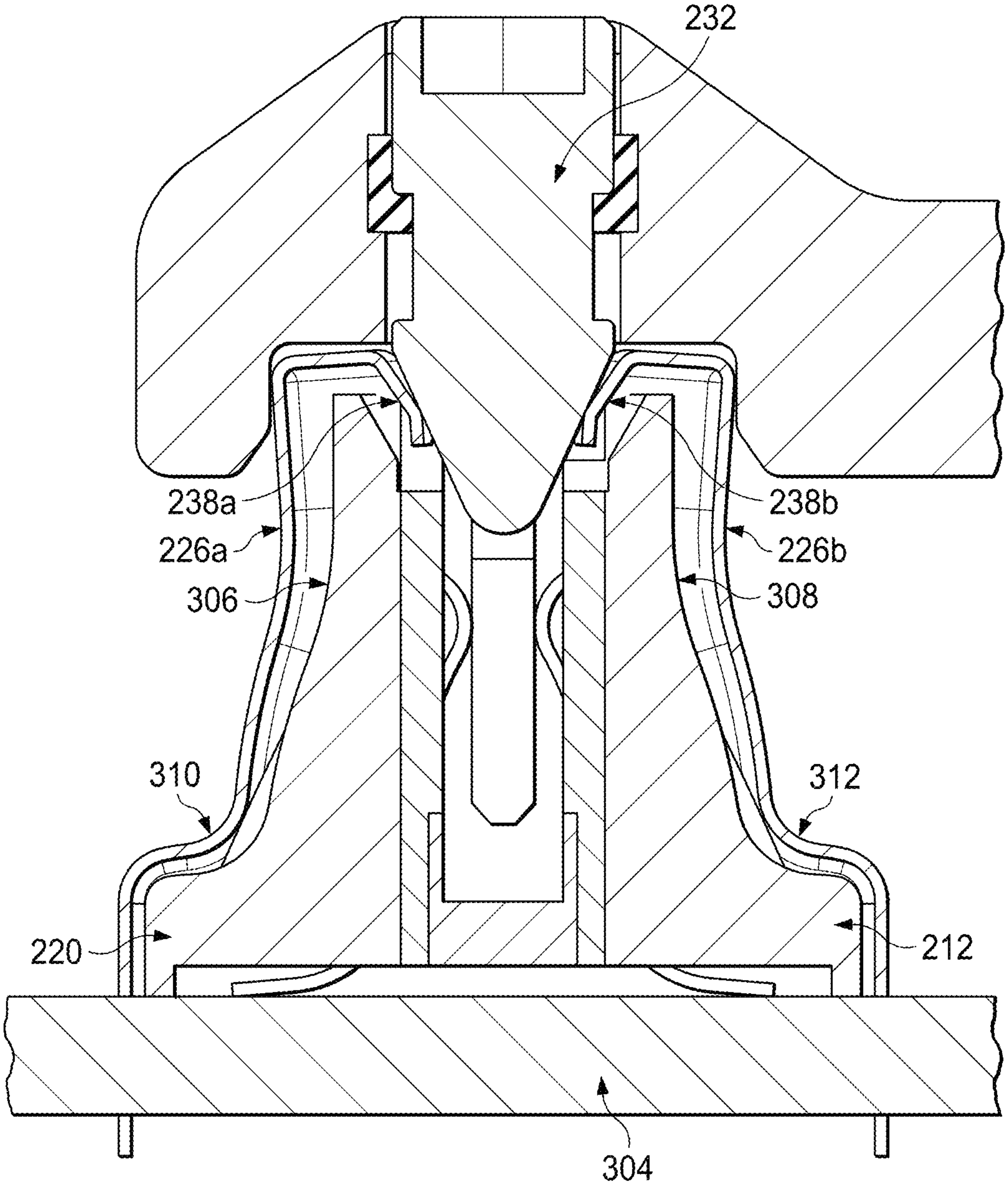
FIG. 6 illustrates an adjustment member of the mating connector, in a first embodiment.

To that end, when the positioning of the adjustment member 232 is adjusted to decrease the distance between the adjustment member 232 and the second end 304 of the receptacle connector 212, the adjustment member 232 adjusts the distance between the first cam flange 238*a* and the second cam flange 238*b* to rotate the first portion 226*a* of the shield 224 about the first spring hinge 310 to increase a distance between the first outer surface 306 of the shell 220 and the first portion 226*a* of the shield 224, as shown in FIG. 6. Furthermore, when the positioning of the adjustment member 232 is adjusted to decrease the distance between the adjustment member 232 and the second end 304 of the receptacle connector 212, the adjustment member 232 adjusts the distance between the first cam flange 238*a* and the second cam flange 238*b* to rotate the second portion 226*b* of the shield 224 about the second spring hinge 312 to increase a distance between the second outer surface 308 of the shell 220 and the second portion 226*b* of the shield 224, as shown in FIG. 6.

To that end, by increasing the distances between the first outer surface 306 and the first portion 226*a* of the shield 224 and the second outer surface 308 and the second portion 226*b* of the shield 224, an air gap is formed (or increased) between the outer surfaces 306, 308 and the portions 226 of the shield 224. To that end, a resonance frequency of the connection assembly 210 can be based on (a function of) the air gap between the outer surfaces 306, 308 and the portions 226 of the shield 224. Specifically, by increasing the air gap between the outer surfaces 306, 308 and the portions 226 of the shield 224, a dielectric height associated with the connection assembly 210 can be increased, thus, making the resonance frequency of the connection assembly 210 adjustable.

Moreover, as the adjustment member 232 is positioned in a middle of the mating connector 214 (as shown in FIG. 4B), the adjustment member 232 is able to provide a symmetrical and consistent adjustment of the distances between the outer surfaces 306, 308 and the portions 226 of the shield 224.

Figure 7:
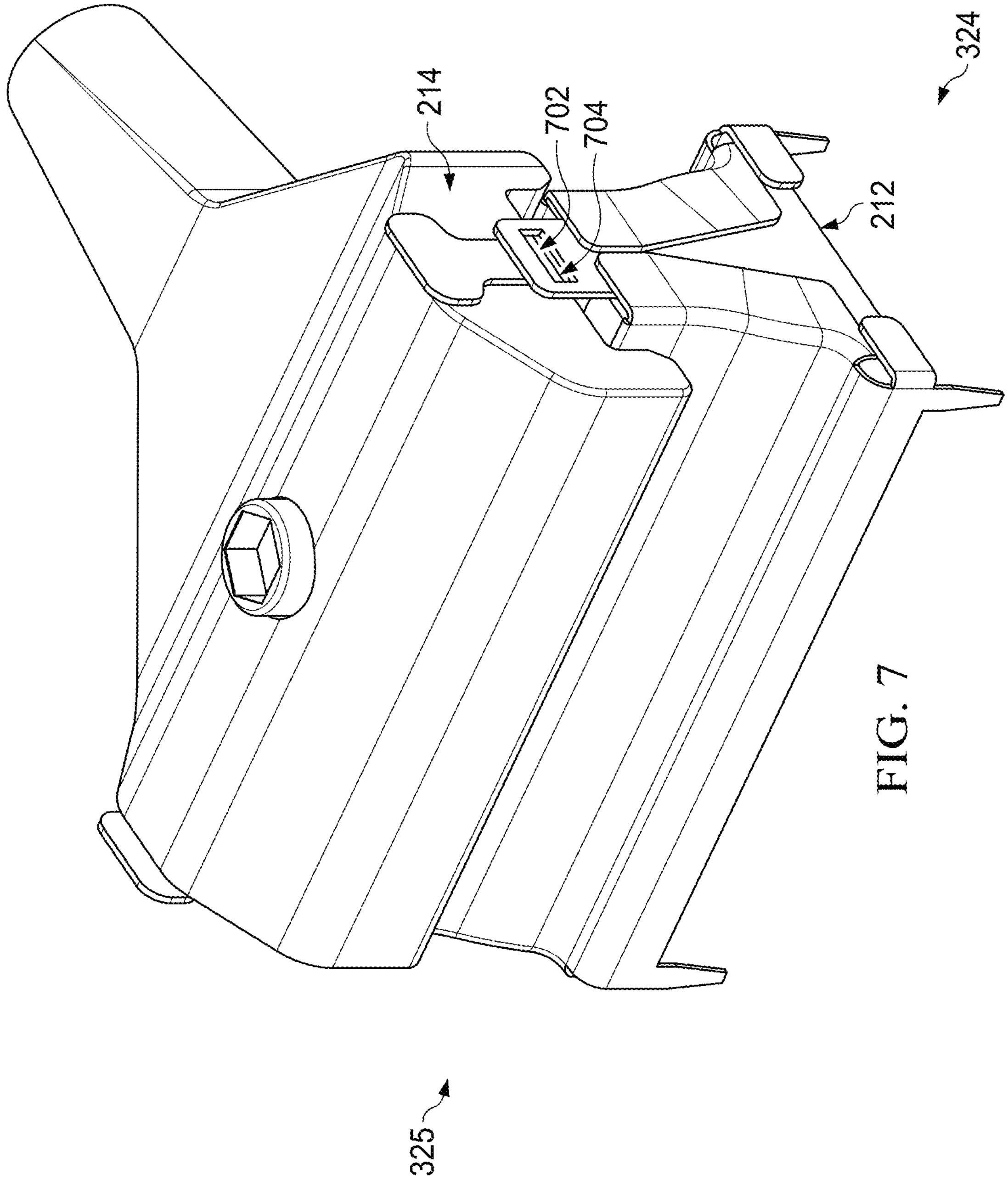
FIG. 7 illustrates a locking mechanism of the connection assembly.

FIG. 7 illustrates a perspective view of the mating connector 214 coupled to the receptacle connector 212. The mating connector 214 can further include mating tabs 702, and the receptacle connector 212 can include mating apertures 704. When the mating connector 214 is coupled to the receptacle connector 212, the mating tabs 702 are positioned within the mating apertures 704. Thus, the mating connector 214 is coupled to the receptacle connector 212 via a positive locking mechanism to prevent unintentional de-mating of the mating connector 214 from the receptacle connector 212. Furthermore, the mating connector 214 can further include mating tabs and the receptacle connector 212 can further include mating apertures, similar to the mating tabs 702 and the mating apertures 745, respectively, positioned on the opposite side (the back side 325).

In some examples, after the mating connector 214 is coupled to the receptacle connector 212, and after the adjustment member 232 is adjusted based on a desired resonance frequency of the connection assembly 210, a positioning of the adjustment member 232 can be secured to maintain the desired resonance frequency of the connection assembly 210. In some examples, to maintain the desired resonance frequency of the connection assembly 210, a set screw (not shown) with a friction locking silicon ring over-molded can be coupled to the adjustment member 232 (to permanently affix the positioning of the adjustment member 232).

Figure 8A:
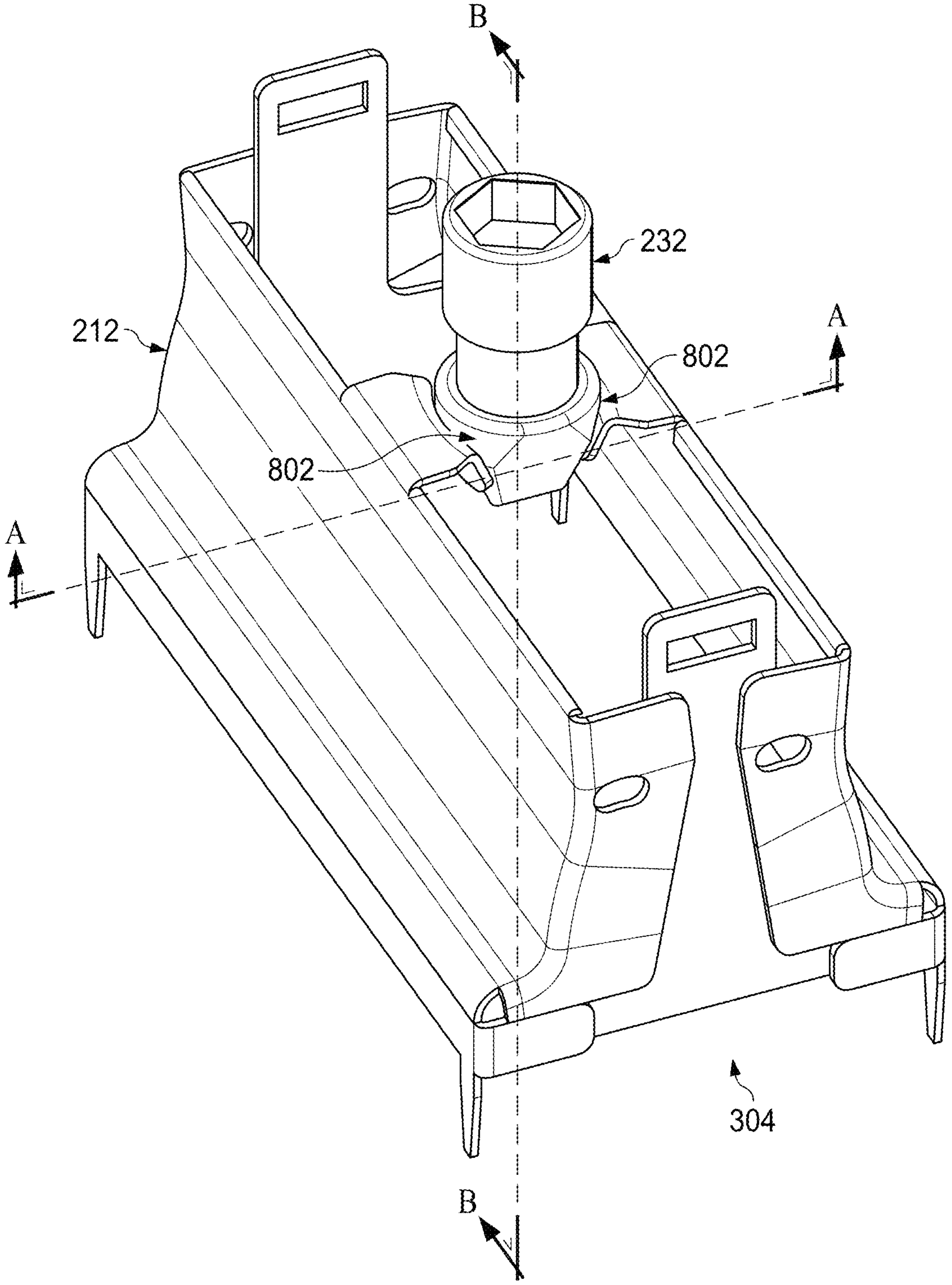
FIGS. 8A-8C illustrate the adjustment connector, in a second embodiment.
Figure 8B:
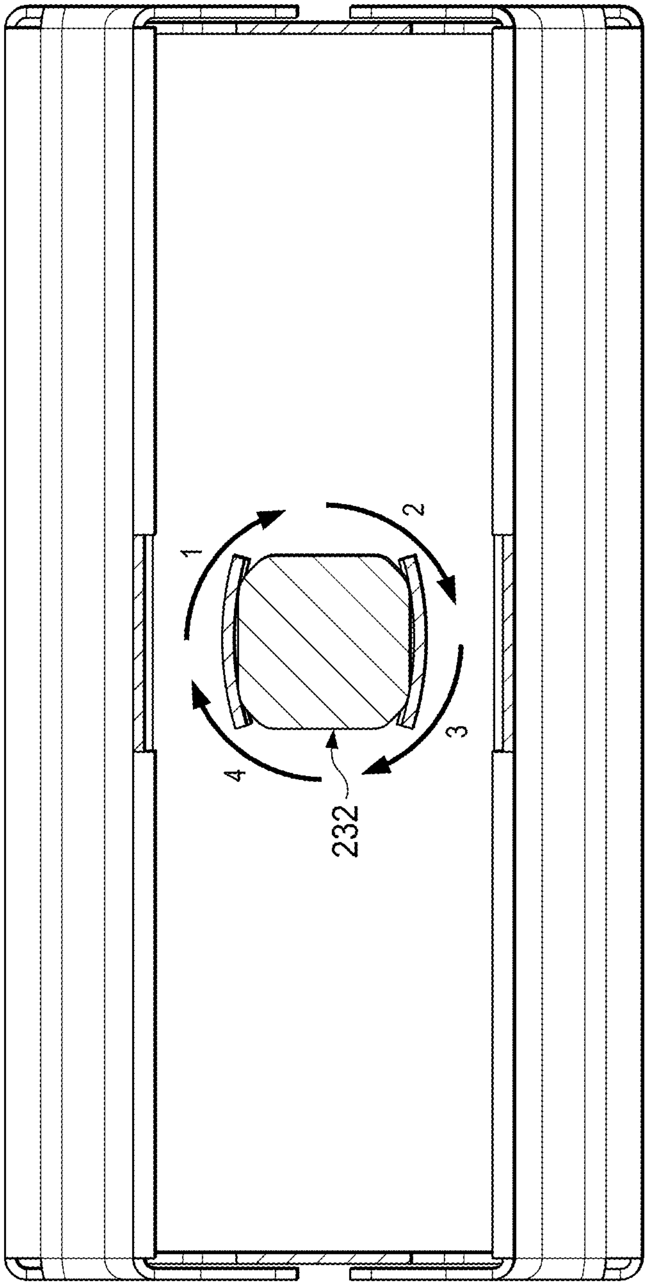
Figure 8C:
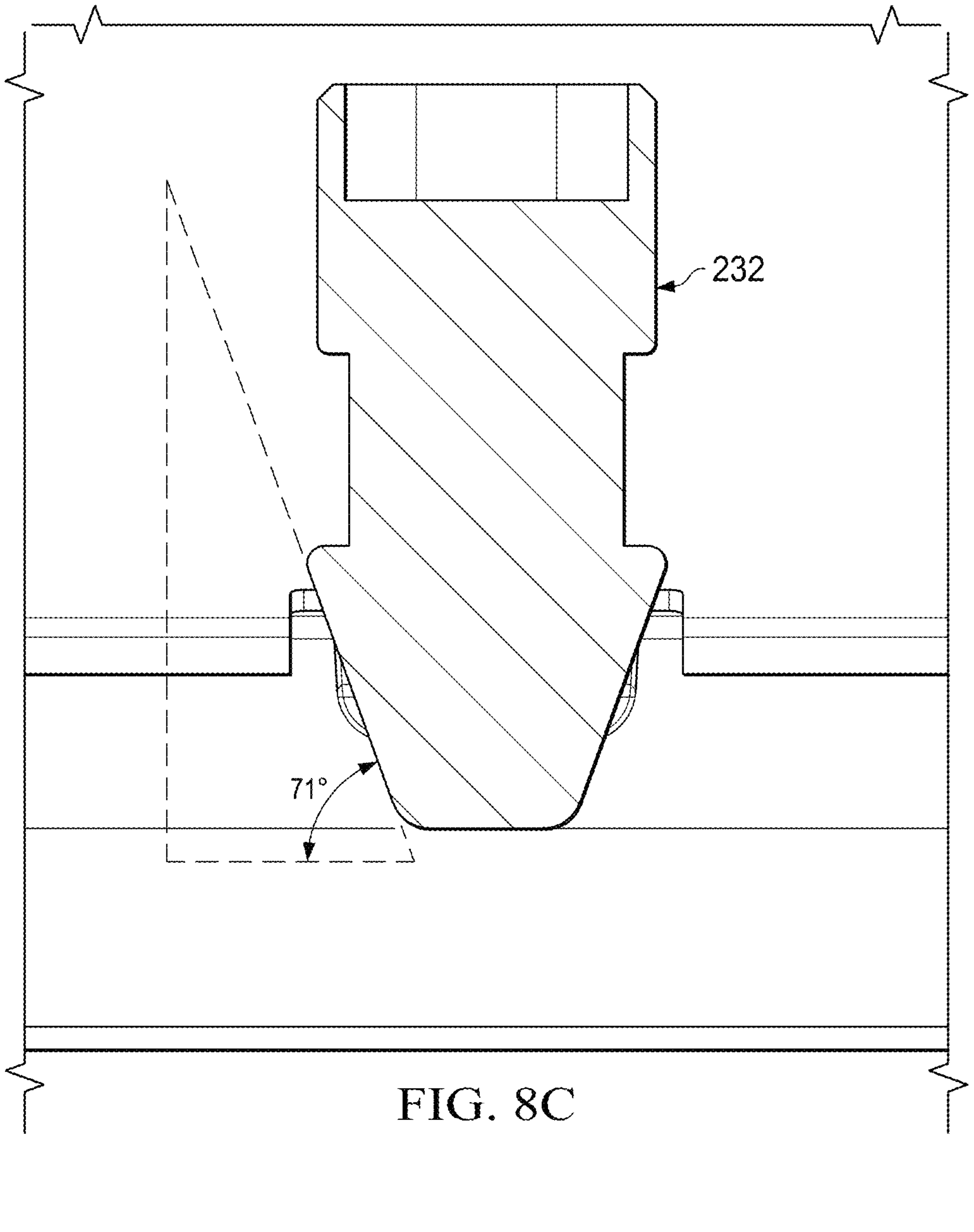

FIG. 8A illustrates a perspective view of the receptacle connector 212 and the adjustment member 232 of the mating connector 214, in a further implementation. In some examples, the adjustment member 232 is a multi-sided pyramid threaded-conical member. In some examples, the adjustment member 232 is a four-sided pyramid threaded-conical member (with two of the flat surfaces 802 shown). That is, the adjustment member 232 has four flat surfaces, such that, as the adjustment member 232 is rotated to decrease a distance between the adjustment member 232 and the second end 304 of the receptacle connector 212, each quarter turn (as shown in FIG. 8B taken along line A-A of FIG. 8A) results in a discrete adjustment step of the distance between the outer surfaces 306, 308 and the portions 226 of the shield 224. The magnitude of each discrete adjustment step is a function of an angle of the adjustment member 232 (threaded-conical member) and a thread pitch count (of the threaded-conical member). For example, for a full revolution of the adjustment member 232 (downward travel of 0.5 mm—along 512 shown in FIG. 5B) and with a pitch of a 71 degrees of the threaded-conical member (as shown in FIG. 8C taking along line B-B of FIG. 8A), the distance between the outer surfaces 306, 308 and the portions 226 of the shield 224 is increased by 0.0068 inches. For approximately 0.02 inches in distance between the outer surfaces 306, 308 and the portions 226 of the shield 224, three full revolutions (twelve quarter turns) of the adjustment member 232 is needed.

Figure 9A:
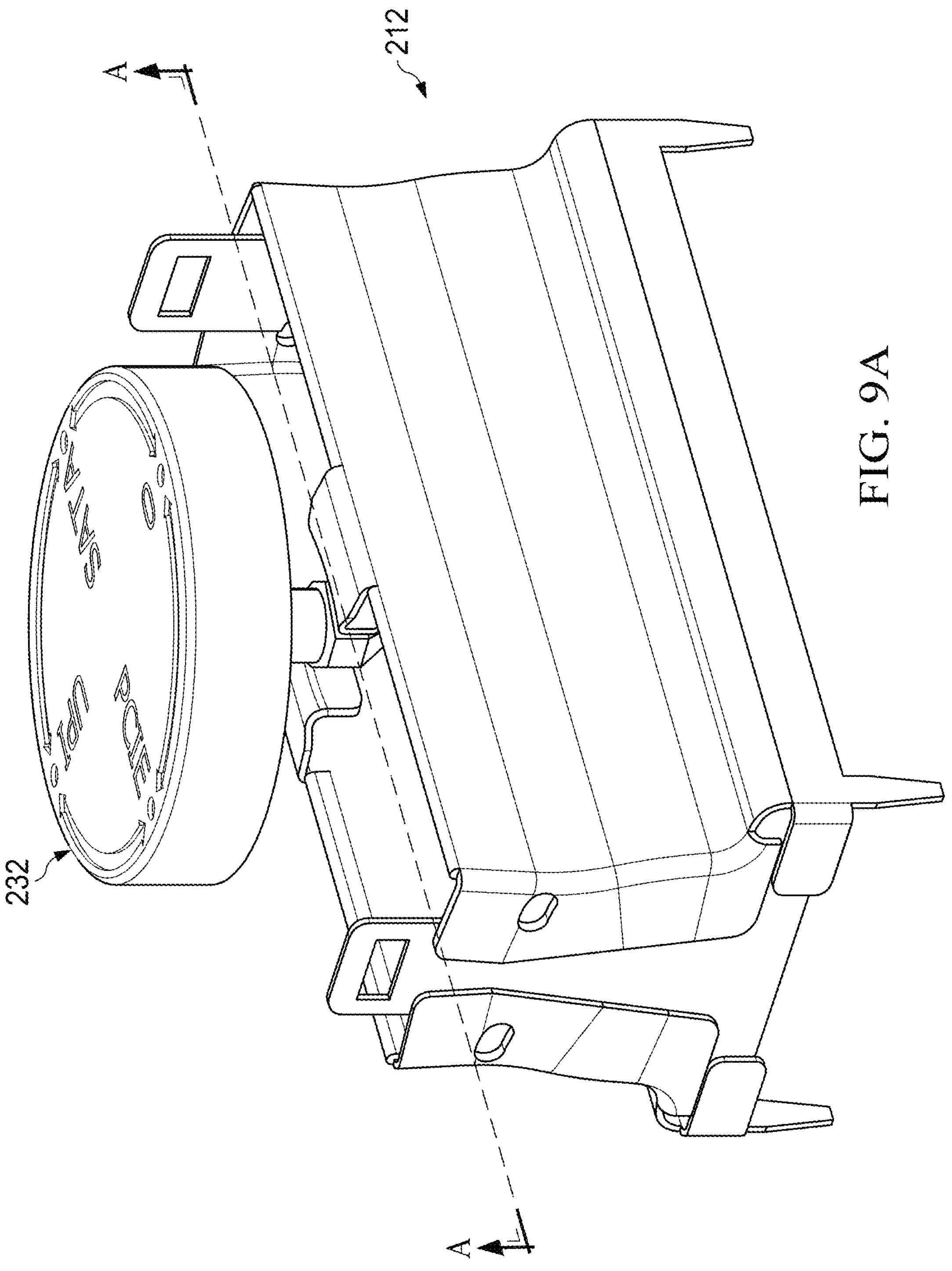
FIGS. 9A-9C illustrate the adjustment connector, in a third embodiment.
Figure 9B:
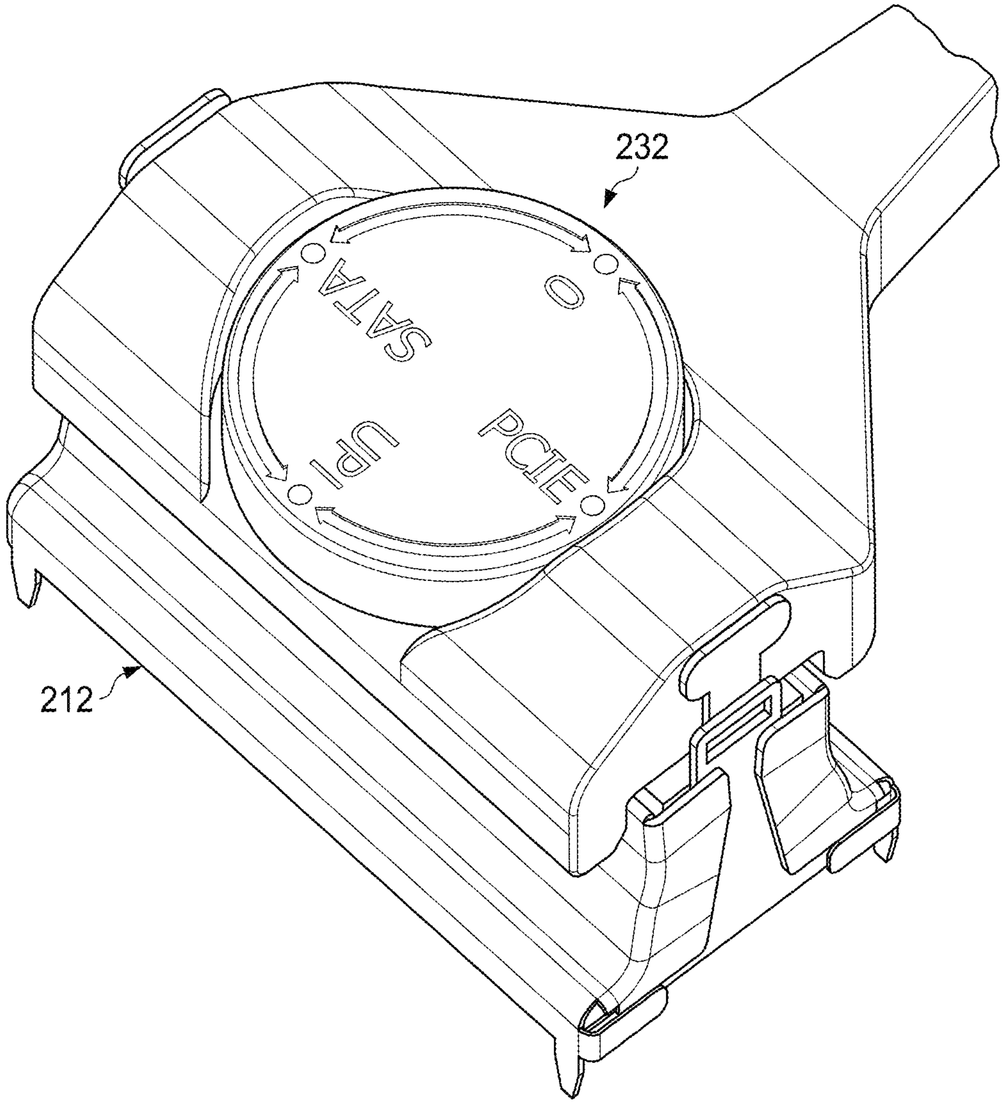
Figure 9C:
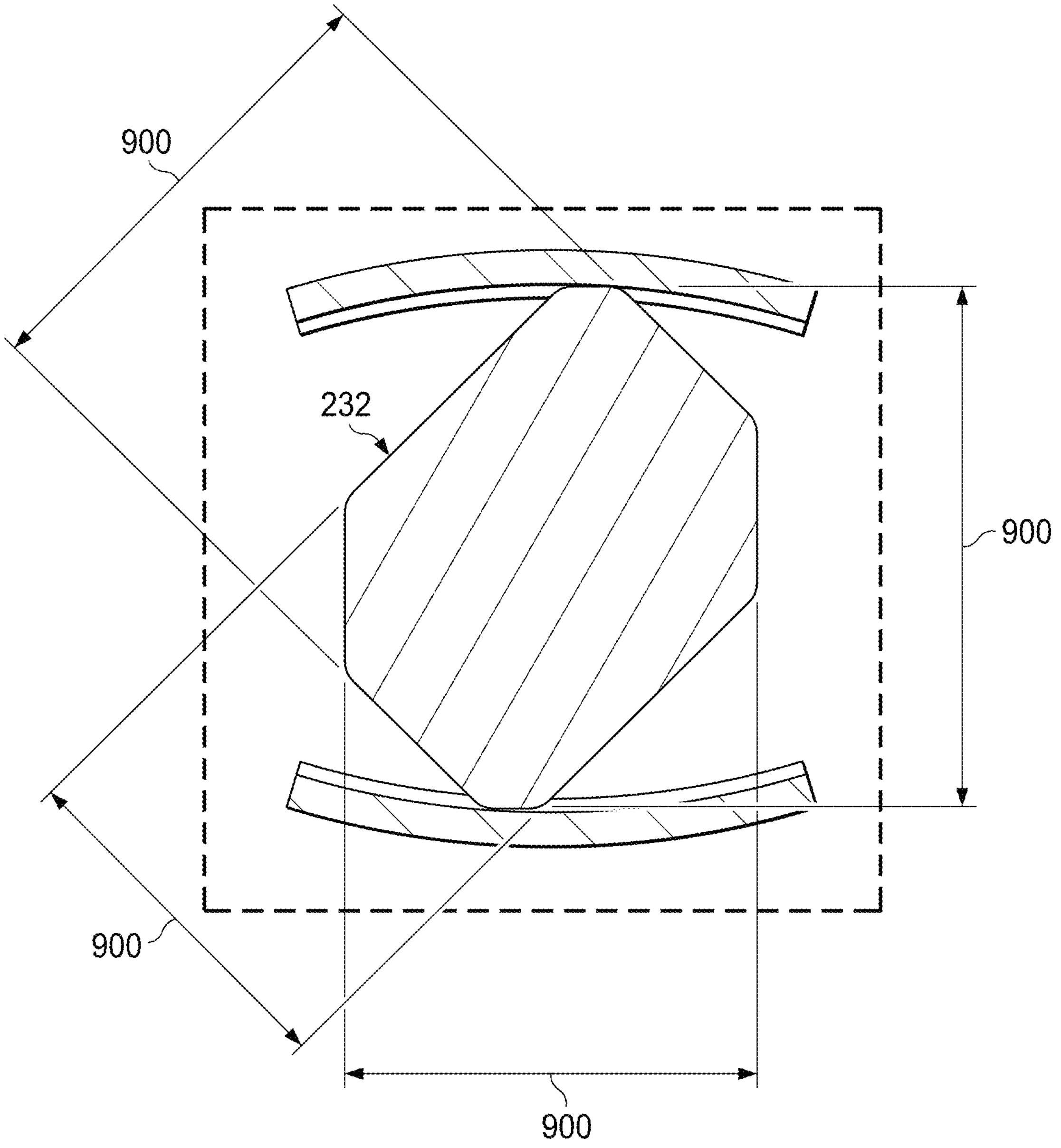

FIG. 9A illustrates a perspective view of the receptacle connector 212 and the adjustment member 232 of the mating connector 214, in a further implementation. In some examples, the adjustment member 232 is an eccentric cam with a plurality of predefined geometries. For example, the adjustment member 232 can be a non-symmetrical eight-sided cam die, with four discrete positions to set the air gap (shown as sides 900 in FIG. 9C taken along line A-A of FIG. 9A). For example, FIG. 9B illustrates the adjustment member 232 include four discrete positioned correlating to a frequency (e.g., 6 Gb/s; 24 Gb/s; 32 Gb/s) of a signal transmitted along the connection assembly 210 (e.g., SATA, UPI, PCIe).

Figure 10:
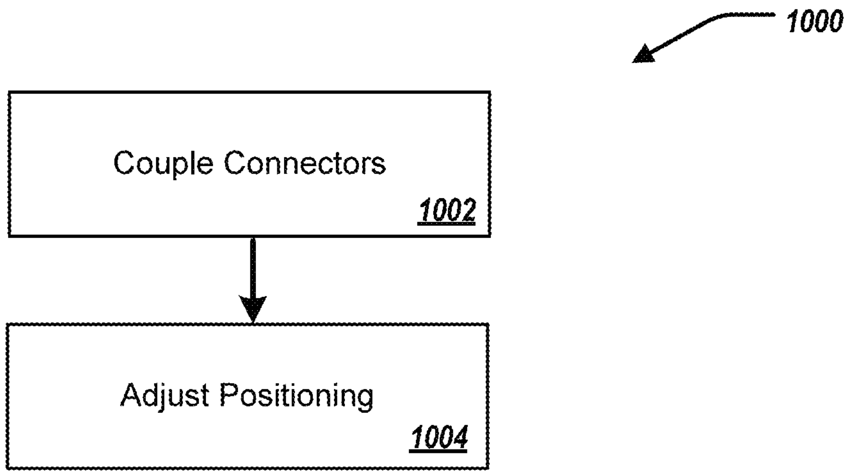
FIG. 10 illustrates a method for coupling of the receptacle connector and the mating connector.

FIG. 10 illustrates a flowchart depicting selected elements of an embodiment of a method 1000 for coupling of a receptacle connector and a mating connector. The method 1000 may be performed with the connection assembly 210, and with reference to FIGS. 1-9. It is noted that certain operations described in method 1000 may be optional or may be rearranged in different embodiments.

The mating connector 214 is coupled with the receptacle connector 212 (1002). Specifically, the mating connector 214 is coupled with the receptacle connector 212 such that the mating connector 214 is in contact with the first cam flange 238*a* and the second cam flange 238*b* of the receptacle connector 212.

A positioning of the adjustment member 232 of the mating connector 214 is adjusted (1004). Specifically, the positioning of the adjustment member 232 of the mating connector 214 is adjusted to decrease a distance between the adjustment member 232 and the second end 304 of the receptacle connector 212 to adjust a distance between the first cam flange 238*a* and the second cam flange 238*b* to rotate the first portion 226*a* of the shield 224 about the first spring hinge 310 and rotate the second portion 226*b* of the shield 224 about the second spring hinge 312.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A connection assembly for use in an information handling system, the connection assembly including:

- a receptacle connector having a first end and a second end opposite to the first end, the receptacle connector including:
  - a shell, including a first outer surface and a second outer surface opposite to the first outer surface;
  - a plurality of contacts;
  - a shield surrounding the shell, the shield including:
    - a first portion including a first cam flange, the first portion rotatable about a first spring hinge;
    - a second portion including a second cam flange, the second portion rotatable about a second spring hinge;
- a mating connector removable coupleable to the receptacle connector, the mating connector including:
  - a computing card; and
  - an adjustment member,
- wherein, when the mating connector is coupled to the receptacle connector, the mating connector is in contact with the first cam flange and the second cam flange, and
- wherein, when a positioning of the adjustment member is adjusted to decrease a distance between the adjustment member and the second end of the receptacle connector, the adjustment member adjusts a distance between the first cam flange and the second cam flange to rotate the first portion of the shield about the first spring hinge and rotate the second portion of the shield about the second spring hinge.

2. The connection assembly of claim 1, wherein, when the positioning of the adjustment member is adjusted to decrease the distance between the adjustment member and the second end of the receptacle connector, the adjustment member adjusts the distance between the first cam flange and the second cam flange to i) rotate the first portion of the shield about the first spring hinge to increase a distance between the first outer surface and the first portion of the shield and ii) rotate the second portion of the shield about the second spring hinge to increase a distance between the second outer surface and the second portion of the shield.

3. The connection assembly of claim 1, wherein the adjustment member is a threaded-conical member.

4. The connection assembly of claim 1, wherein the adjustment member is a multi-sided pyramid threaded-conical member.

5. The connection assembly of claim 1, wherein the adjustment member is an eccentric cam with a plurality of predefined geometries.

6. The connection assembly of claim 1, the mating connector further includes mating tabs and the receptacle connector includes mating apertures, wherein, when the mating connector is coupled to the receptacle connector, the mating tabs of the mating connector are positioned within the mating apertures of the receptacle connector.

7. The connection assembly of claim 1, wherein, when the mating connector is coupled to the receptacle connector, the computing card of the mating connector is in contact with the plurality of contacts of the receptacle connector.

8. The connection assembly of claim 1, wherein the receptacle connector includes a first post and a second post, the first portion of the shield includes a first aperture, and the second portion of the shield includes a second aperture, wherein the first post of the receptacle connector is positioned within the first aperture to define the rotation of the first portion of the shield about the first spring hinge and the second post of the receptacle connector is positioned within the second aperture to define the rotation of the second portion of the shield about the second spring hinge.

9. The connection assembly of claim 2, wherein the increased distances increases a dielectric height of the connection assembly.

10. The connection assembly of claim 2, wherein the increased distances adjusts a resonance frequency of the connection assembly.

11. An information handling system, comprising:
a processor;
memory media storing instructions executable by the processor to perform operations;
a connection assembly, including:
a receptacle connector having a first end and a second end opposite to the first end, the receptacle connector including:
a shell, including a first outer surface and a second outer surface opposite to the first outer surface;
a plurality of contacts;
a shield surrounding the shell, the shield including:
a first portion including a first cam flange, the first portion rotatable about a first spring hinge;
a second portion including a second cam flange, the second portion rotatable about a second spring hinge;
a mating connector removable coupleable to the receptacle connector, the mating connector including:
a computing card; and
an adjustment member,
wherein, when the mating connector is coupled to the receptacle connector, the mating connector is in contact with the first cam flange and the second cam flange, and
wherein, when a positioning of the adjustment member is adjusted to decrease a distance between the adjustment member and the second end of the receptacle connector, the adjustment member adjusts a distance between the first cam flange and the second cam flange to rotate the first portion of the shield about the first spring hinge and rotate the second portion of the shield about the second spring hinge.

12. The information handling system of claim 11, wherein, when the positioning of the adjustment member is adjusted to decrease the distance between the adjustment member and the second end of the receptacle connector, the adjustment member adjusts the distance between the first cam flange and the second cam flange to i) rotate the first portion of the shield about the first spring hinge to increase a distance between the first outer surface and the first portion of the shield and ii) rotate the second portion of the shield about the second spring hinge to increase a distance between the second outer surface and the second portion of the shield.

13. The information handling system of claim 11, wherein the adjustment member is a threaded-conical member.

14. The information handling system of claim 11, wherein the adjustment member is a multi-sided pyramid threaded-conical member.

15. The information handling system of claim 11, wherein the adjustment member is an eccentric cam with a plurality of predefined geometries.

16. The information handling system of claim 11, the mating connector further includes mating tabs and the receptacle connector includes mating apertures, wherein, when the mating connector is coupled to the receptacle connector, the mating tabs of the mating connector are positioned within the mating apertures of the receptacle connector.

17. The information handling system of claim 11, wherein the receptacle connector includes a first post and a second post, the first portion of the shield includes a first aperture, and the second portion of the shield includes a second aperture, wherein the first post of the receptacle connector is positioned within the first aperture to define the rotation of the first portion of the shield about the first spring hinge and the second post of the receptacle connector is positioned within the second aperture to define the rotation of the second portion of the shield about the second spring hinge.

18. The information handling system of claim 12, wherein the increased distances increases a dielectric height of the connection assembly.

19. The information handling system of claim 12, wherein the increased distances adjusts a resonance frequency of the connection assembly.

20. A method, comprising:
coupling a mating connector with a receptacle connector such that the mating connector is in contact with a first cam flange and a second cam flange of the receptacle connector, the first cam flange included by a first portion of a shield that surrounds a shell of the receptable connector, the second cam flange included by a second portion of the shield; and
adjusting a positioning of an adjustment member of the mating connector to decrease a distance between the adjustment member and a second end of the receptacle connector, opposite to a first end of the receptacle connector, to adjust a distance between the first cam flange and the second cam flange to rotate the first portion of the shield about a first spring hinge and rotate the second portion of the shield about a second spring hinge.

* * * * *